(12) United States Patent
Kobayashi et al.

(10) Patent No.: US 9,014,433 B2
(45) Date of Patent: Apr. 21, 2015

(54) MEASUREMENT APPARATUS, INFORMATION PROCESSING APPARATUS, INFORMATION PROCESSING METHOD, AND STORAGE MEDIUM

(71) Applicant: Canon Kabushiki Kaisha, Tokyo (JP)

(72) Inventors: Kazuhiko Kobayashi, Yokohama (JP); Masakazu Fujiki, Kawasaki (JP); Shinji Uchiyama, Yokohama (JP); Keisuke Tateno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/738,351

(22) Filed: Jan. 10, 2013

(65) Prior Publication Data

US 2013/0127998 A1    May 23, 2013

Related U.S. Application Data

(63) Continuation of application No. PCT/JP2012/067545, filed on Jul. 10, 2012.

(30) Foreign Application Priority Data

Jul. 11, 2011 (JP) .................... 2011-152839
Jul. 4, 2012 (JP) .................... 2012-150471

(51) Int. Cl.
*G06T 7/00* (2006.01)
*G01B 11/00* (2006.01)
*G01B 11/25* (2006.01)

(52) U.S. Cl.
CPC ............... *G06T 7/004* (2013.01); *G01B 11/00* (2013.01); *G01B 11/25* (2013.01)

(58) Field of Classification Search
CPC ..................................................... G06T 7/003
USPC ...................................... 348/46, 94; 382/106
See application file for complete search history.

(56) References Cited

U.S. PATENT DOCUMENTS

| | | | | |
|---|---|---|---|---|
| 6,611,343 | B1 * | 8/2003 | Frankowski | 356/601 |
| 2006/0285755 | A1 * | 12/2006 | Hager et al. | 382/224 |
| 2009/0284757 | A1 * | 11/2009 | Mayer et al. | 356/602 |

FOREIGN PATENT DOCUMENTS

| | | |
|---|---|---|
| CN | 1300360 A | 6/2001 |
| JP | 63-78009 A | 4/1988 |

(Continued)

OTHER PUBLICATIONS

Koninckx, Thomas P. "Real Time Range Acquisition by Adapative Structred Light". IEEE Transactions on Pattern Analysis and Machine Intelligence, vol. 28, No. 3, Mar. 2006. Pages 432-445.*

(Continued)

*Primary Examiner* — Sath V Perungavoor
*Assistant Examiner* — Jeffery Williams
(74) *Attorney, Agent, or Firm* — Canon USA Inc. IP Division (57) ABSTRACT

A measurement apparatus includes a projection unit configured to project pattern light onto an object to be measured, an imaging unit configured to capture an image of the object to be measured on which the pattern light is projected to acquire a captured image of the object to be measured, a measurement unit configured to measure a position and/or orientation of the object to be measured on the basis of the captured image, a position and orientation of the projection unit, and a position and orientation of the imaging unit, a setting unit configured to set identification resolution of the pattern light using a range of variation in the position and/or orientation of the object to be measured; and a change unit configured to change a pattern shape of the pattern light in accordance with the identification resolution.

14 Claims, 7 Drawing Sheets

(56) References Cited

FOREIGN PATENT DOCUMENTS

| JP | 2003-083730 A | 3/2003 |
|---|---|---|
| JP | 2003-518614 A | 6/2003 |
| JP | 2004-110804 A | 4/2004 |
| JP | 2011-237296 A | 11/2011 |
| JP | 2012-079294 A | 4/2012 |

OTHER PUBLICATIONS

Thomas P. Koninckx and Luc Van Gool, "Real-Time Range Acquisition by Adaptive Structured Light", IEEE Transactions on Pattern Analysis and Machine Intelligence, vol. 28, No. 3, pp. 432-445, (2006).

Paul J. Besl and Neil D. McKay, "A Method for registration of 3-D Shapes", IEEE Transactions on Pattern Analysis and Machine Intelligence, vol. 14, No. 2, pp. 239-256, (1992).

Yang Chen and Gerard Medioni, "Object Modeling by Registration of Multiple Range Images", Proceedings of the 1991 IEEE International Conference on Robotics and Automation, vol. 3, pp. 2724-2729, (1991).

Paul M. Griffin, Lakshmi S. Narasimhan and Suong R. Yee, "Generation of Uniquely Encoded Light Patterns for Range Data Acquisition", Pattern Recognition, vol. 25, No. 6, pp. 609-616, (1992).

* cited by examiner

| CODING LENGTH | N | M |
|---|---|---|
| 3 | 10 | 29 |
| 4 | 17 | 66 |
| 5 | 26 | 127 |
| 6 | 37 | 218 |
| 7 | 50 | 345 |
| 8 | 65 | 514 |
| 9 | 82 | 731 |
| 10 | 101 | 1002 |
| 11 | 122 | 1333 |
| 12 | 145 | 1730 |
| 13 | 170 | 2199 |
| 14 | 197 | 2746 |
| 15 | 226 | 3377 |
| 16 | 257 | 4098 |

MEASUREMENT APPARATUS, INFORMATION PROCESSING APPARATUS, INFORMATION PROCESSING METHOD, AND STORAGE MEDIUM

CROSS-REFERENCE TO RELATED APPLICATIONS

This application is a Continuation of International Patent Application No. PCT/JP2012/067545, filed Jul. 10, 2012, which claims the benefit of Japanese Patent Application No. 2011-152839, filed Jul. 11, 2011 and Japanese Patent Application No. 2012-150471, filed Jul. 4, 2012, all of which are hereby incorporated by reference herein in their entirety.

TECHNICAL FIELD

The present invention relates to a measurement apparatus and an information processing apparatus that acquire information on a three-dimensional position of a three-dimensional object.

BACKGROUND ART

Among technologies for acquiring three-dimensional position information on an object to be measured is one that measures a range image by a pattern projection method.

According to the pattern projection method, a projection apparatus initially projects a two-dimensional pattern onto a space to be measured. An image capturing unit (camera) then captures an image of the space to be measured, and a pattern is detected from the captured image. A distance to the object to be measured is measured by triangulation using the detected pattern.

Distance values to be output are typically expressed as pixel values of a captured image. Such an image whose pixels indicate a distance is referred to as a range image.

A projection pattern used to measure a range image includes figures that are used to calculate a distance by triangulation (hereinafter, referred to as distance measurement figures) and figures that include an identifier embedded to distinguish a distance measurement figure from others (hereinafter, referred to identification figures). Examples of the distance measurement figures include a straight line. Examples of the identifiers include a geometric pattern and a color combination.

To improve the measurement density of a range image in a space to be measured, it is desirable to increase the density of distance measurement figures in a projection pattern. In the meantime, such distance measurement figures need to be distinguishable from each other for the sake of triangulation. Identification figures that allow unique identification in the entire pattern therefore need to be embedded in the distance measurement figures for the purposes of distance measurement.

Another approach is predicated on that an object to be measured lying in a space to be measured is a continuous smooth surface. According to the method, distance measurement figures are identified based on the continuity of the distance measurement figures without using identification figures.

Thomas P. Knonckx and Luc Van Gool, "Real-Time Range Acquisition by Adaptive Structured Light," IEEE Transactions on Pattern Analysis and Machine Intelligence, Vol. 28, No. 3, pp. 432-445, (2006), discusses a method that includes continuously measuring a range image to detect a change of identification figures based on the fact that distance measurement figures do not vary greatly between consecutive frames, and changing a projection pattern. In the above document, the distance measurement figures include parallel lines, whereas the identification figures include oblique lines in different colors. The projection pattern includes figures to be a code, which are arranged at the intersections of distance measurement figures and identification figures.

The presence or absence of the arranged codes is interpreted as a code string and used as the number of an adjoining distance measurement figure. A projection pattern is changed according to detection errors of identification figures and distance measurement figures between consecutive frames. If detection errors are large, the intervals of distance measurement figures are increased and repetitions of identification figures are reduced. Since the distances between adjoining figures are widened, the number of distance measurement locations decreases but with a reduction in the possibility of erroneous detection. The total amount of distance points varies less between frames.

A range imaging acquisition method using a single projection pattern can acquire a range image in a shorter time than by techniques that need a plurality of projection patterns. Such a range imaging acquisition method is thus used in situations where a high speed response is required. According to the technology discussed in the foregoing document, the detection accuracy of distance measurement figures and identification figures depends on a surface shape to be measured.

The higher the density of distance measurement figures becomes, the more likely erroneous detection occurs between adjoining distance measurement figures. Identification figures also need to have a greater number of elements. Each individual figure element becomes greater, which makes a threshold for identification determination difficult to set.

The foregoing document discusses a method for adjusting such projection patterns. The method includes adjusting repeat intervals of the distance measurement figures and the identification figures according to variations of detection errors during continuous range imaging.

Since the method uses an erroneous detection ratio of a pattern projected onto a target object that varies gently between consecutive frames, the application of the method to highly variable environment or to a case of capturing only a single range image has been difficult. In other words, there has been no mechanism for a single projection pattern that allows effective acquisition of a range image.

SUMMARY OF INVENTION

The present invention is directed to appropriately setting a pattern shape of a projection pattern in three-dimensional position measurement.

According to an aspect of the present invention, a measurement apparatus includes a projection unit configured to project pattern light onto an object to be measured, an imaging unit configured to capture an image of the object to be measured on which the pattern light is projected to acquire a captured image of the object to be measured, a measurement unit configured to measure a position and/or orientation of the object to be measured on the basis of the captured image, a position and orientation of the projection unit, and a position and orientation of the imaging unit, a setting unit configured to set identification resolution of the pattern light using a range of variation in the position and/or orientation of the object to be measured; and a change unit configured to change a pattern shape of the pattern light in accordance with the identification resolution.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 1:
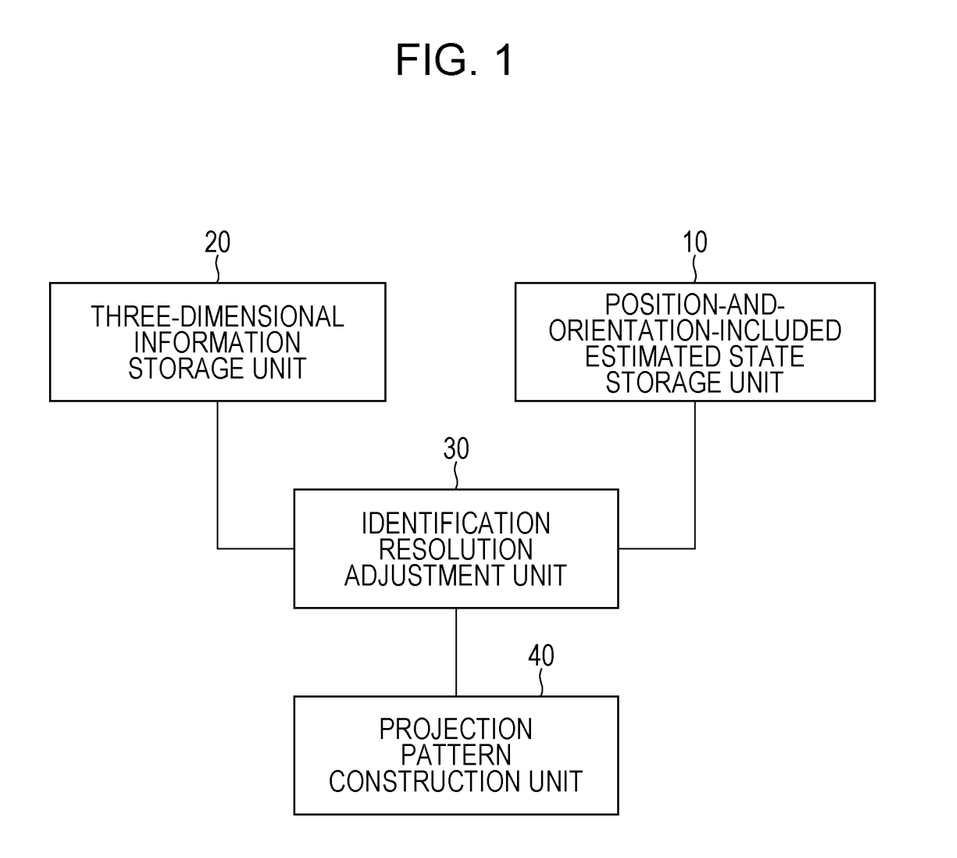
FIG. 1 is a diagram illustrating a configuration of a three-dimensional measurement apparatus according to a first exemplary embodiment of the present invention.

FIG. 1 is a diagram illustrating a configuration of a three-dimensional measurement apparatus according to a first exemplary embodiment.

A three-dimensional information storage unit 20 stores three-dimensional information on an object to be measured. As employed herein, the three-dimensional information includes values that define the size and shape of an object to be measured. The three-dimensional information may be expressed by using a numerical table or polygonal models.

A position-and-orientation-included estimated state storage unit 10 stores values that indicate what state the object to be measured is in an observation space. The position-and-orientation-included estimated state storage unit 10 stores information including at least the position and orientation of the object to be measured in a previously-set three-dimensional space.

An identification resolution adjustment unit 30 is a processing unit that adjusts parameters related to identification resolution of a projection pattern by using the information stored in the three-dimensional information storage unit 20 and the information stored in the position-and-orientation-included estimated state storage unit 10.

In the present embodiment, the parameters related to identification resolution include parameters on a pattern shape of pattern light. Further, the parameters on a pattern shape of pattern light include the density between patterns of the pattern light, and the length of code strings of patterns of the pattern light.

A projection pattern construction unit 40 is a processing unit that constructs a projection pattern by using parameters adjusted by the identification resolution adjustment unit 30.

The position-and-orientation-included estimated state storage unit 10, the three-dimensional information storage unit 20, the identification resolution adjustment unit 30, and the projection pattern construction unit 40 described above can be implemented by a control unit that includes a typical storage medium and a central processing unit (CPU). Functioning as an information processing apparatus, the control unit reads a computer program for performing various types of processing from a recording medium storing the computer program, and performs various types of processing.

Figure 2:
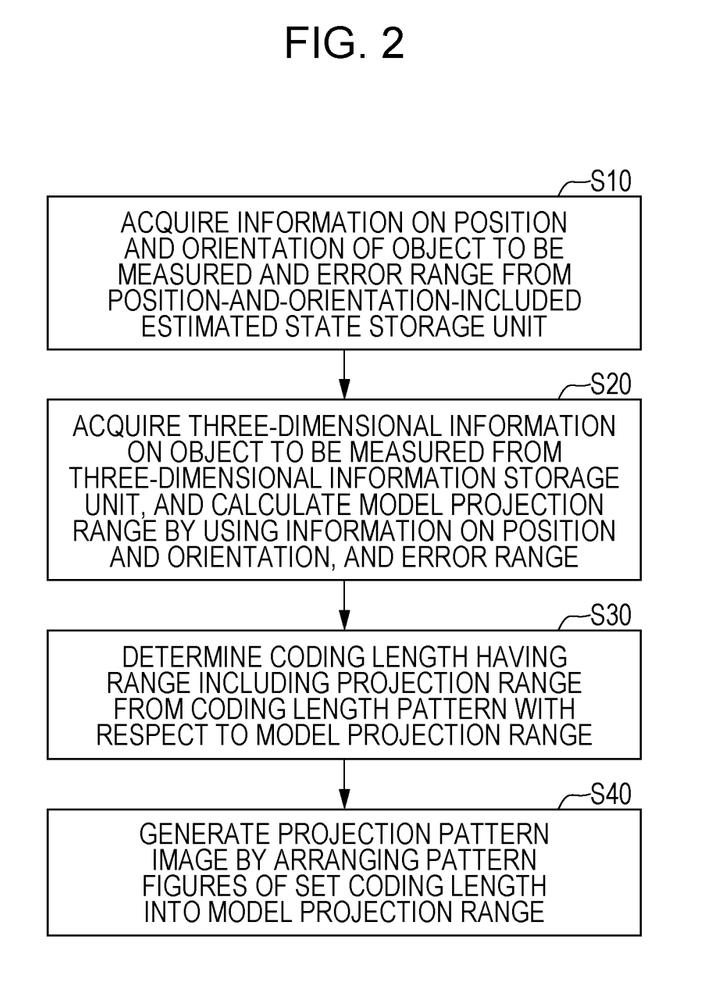
FIG. 2 is a diagram illustrating a procedure for processing of the three-dimensional measurement apparatus according to the first exemplary embodiment.

Referring to FIG. 2, a procedure for processing of the three-dimensional measurement apparatus according to the present exemplary embodiment will be described below.

In step S10, the three-dimensional measurement apparatus according to the present exemplary embodiment acquires information on the position and orientation of an object to be measured and an error range from the position-and-orientation-included estimated state storage unit 10.

As employed herein, the position and orientation of an object are expressed by translational components and rotational components in a predetermined three-dimensional coordinate system. The error range includes values expressed in terms of uncertainty or accuracy of the values of the translational components and rotational components at each position and orientation. The error range may be expressed as a range of variation of the object.

As employed herein, the error range includes variances of position and orientation parameters. Assuming that the position and orientation of an object include translational components ($X_m$, $Y_m$, $Z_m$) and rotational components ($R_x$, $R_y$, $R_z$), variances of the translational components will be expressed as ($\sigma_{xm}$, $\sigma_{ym}$, $\sigma_{zm}$). Variances of the rotational components will be expressed as ($\sigma_{rx}$, $\sigma_{ry}$, $\sigma_{rz}$). The position and orientation and the error range can thus be expressed by 12 parameters.

If approximate values of the position and orientation of an object to be measured are determined in the environment where the object is captured, such values may be used. For example, if a measurement stage and an imaging apparatus are arranged in a fixed relationship and an object to be measured is placed on the measurement stage, then approximate values of the positional relationship and arrangement relationship with respect to the measurement stage may be used.

An image of an object to be measured included in a captured image may be presented by a graphical interface (graphical user interface: GUI) so that a user can select the range of the object to be measured in the image. Parameters may be calculated based on the selected range.

A procedure for determining the position, out of the position and orientation, of an object by using an image captured by a camera of an imaging apparatus will be described. Basically, the position is calculated based on triangulation (trigonometry).

Suppose that camera parameters are known and the distance from the camera to the object is $Z_d$. The distance from the camera to the object, measured by a tape measure, is used as an approximate value of $Z_d$. An image captured by the camera is presented by GUI, and the user specifies the center of an area of the object. The center of the area may be determined by image processing. In such a case, the image may be binarized so that the object to be measured and its background are separable, followed by determination of the barycenter of the object area. Suppose that the center of the area has image coordinates (Ub, Vb), which can be transformed into a position in a three-dimensional space by the following equations (1):

$$Xm = Zd \cdot (Ub - cx)/fx$$

$$Ym = Zd \cdot (Vb - cy)/fy$$

$$Zm = Zd \quad (1)$$

where fx is a focal length in an X-axis direction, fy is a focal length in a Y-axis direction, cx is a position of a principle point in the X-axis direction, and cy is a position of the principle point in the Y-axis direction. Each of fx, fy, cx, and cy is a camera parameter. Variances (σx, σy, σz) of a position specify a range where the object to be measured is arranged.

Suppose here that an object to be measured is placed in a position within the range of an installation table. The surface of the installation table is observed from a camera in advance to acquire the range of installation. The acquired values may be set as (σx, σy, σz). In fact, more reliable variances may be set if available.

As for rotations about axes of rotation, initial values of the orientation of a model in a camera coordinate system and errors thereof are set as rotational components (Rx, Ry, Rz) and their variances (σrx, σry, σrz). If the object to be measured is close to a sphere, any of the values may be arbitrary. If the object to be measured has a long slender shape, orientation information becomes more important. The rotational components (Rx, Ry, Rz) can be easily set by a method of changing the orientation of the model by GUI and employing orientation values when the model looks like the object to be measured in the captured image. Variances (σrx, σry, σrz) of the orientation may be arbitrarily set since the variances also depend on the shape of the object to be measured.

The position-and-orientation-included estimated state storage unit 10 may use any method of expression and any storage unit available as long as the position and orientation of the object and their uncertainty values are stored.

For example, a difference from previously registered information may be used as an index of uncertainty of position and orientation values. An object to be measured may be observed from a plurality of points of view in advance and the resultant may be stored as images. A correlation value between an image of a corresponding point of view and a captured image may be used as an index of uncertainty. A difference between a previously registered point of view and a stored position and orientation may be used. Any method of expression and calculation may be used as long as some kind of state of position and orientation is expressed in numerical values and a range of certainty of the position and orientation values is available.

If the position and orientation of the object to be measured are unknown, variances may be set to the size of an imaging screen. With such a setting, the object to be measured can be handled as appearing somewhere in the imaging screen.

In step S20, the three-dimensional measurement apparatus according to the present exemplary embodiment acquires three-dimensional information on the object to be measured from the three-dimensional information storage unit 20. The three-dimensional measurement apparatus then calculates a projection range of the object to be measured in the captured image by using the information on the position and orientation acquired in step S10 and the error range. As employed herein, such a projection range will be referred to as a model projection range.

The three-dimensional information storage unit 20 stores information on a shape of an object as three-dimensional information on the object to be measured. Specifically, the three-dimensional information storage unit 20 may store information on a model that includes discrete polygons to which the object surfaces are approximated. The three-dimensional information storage unit 20 may store information on the shape and size of a simple solid figure such as a rectangular solid, a circular cylinder, and a sphere to which the object to be measured is approximated.

Take, for example, a case of using a captured image of an object to be measured, captured from a previously set point of view. In such a case, a model projection range can be expressed as a view cone that ranges to cover the object to be measured, based on the captured image and the position and orientation of the imaging apparatus.

The three-dimensional measurement apparatus calculates the range of projection on image coordinates of a pattern projection plane on the assumption that the shape model stored in the three-dimensional information storage unit 20 lies within a range that takes account of the three-dimensional position and orientation and their error range acquired in step S10.

A description will now be given of a case where the three-dimensional information storage unit 20 stores information on a rectangular solid as three-dimensional information on the shape of the object to be measured. Suppose that vertexes of the rectangular solid have coordinates of B(i)=[X(i), Y(i), Z(i)] (where i=1 to 8) with the barycenter of the rectangular solid as an origin point. Suppose also that the position and orientation acquired in step S10 include translational components (Xm, Ym, Zm) and rotational components (Rx, Ry, Rz) in terms of a camera coordinate system. When a vertex B(i) is transformed into the camera coordinate system, a resulting vertex Bc(i)=[Xc(i), Yc(i), Zc(i)] can be calculated by the following equation (2):

$$Bc(i) = \begin{bmatrix} Xc(i) \\ Yc(i) \\ Zc(i) \end{bmatrix} = \begin{bmatrix} \cos(Rz) & \sin(Rz) & 0 \\ -\sin(Rz) & \cos(Rz) & 0 \\ 0 & 0 & 1 \end{bmatrix} \begin{bmatrix} \cos(Ry) & 0 & -\sin(Ry) \\ 0 & 1 & 0 \\ \sin(Ry) & 0 & \cos(Ry) \end{bmatrix} \begin{bmatrix} 1 & 0 & 0 \\ 0 & \cos(Rx) & \sin(Rx) \\ 0 & -\sin(Rx) & \cos(Rx) \end{bmatrix} \begin{bmatrix} X(i) \\ Y(i) \\ Z(i) \end{bmatrix} + \begin{bmatrix} Xm \\ Ym \\ Zm \end{bmatrix} \quad (2)$$

Suppose also that a fundamental matrix E that expresses the transformation from the camera coordinate system into the coordinate system of the apparatus that projects a projection pattern has been obtained from calibration values in advance. A vertex Bc(i) in the camera coordinate system can be transformed into a vertex Bp(i)=[Xp(i), Yp(i), Zp(i)] in the coordinate system of the projection pattern by multiplying the fundamental matrix E by the vertex Bc(i) in the camera coordinate system, i.e., Bp(i)=E·Bc(i).

The three-dimensional measurement apparatus calculates a projected position UVp(i) of each vertex Bp(i) on a projection pattern screen by the following equation (3):

$$UVp(i) = \begin{bmatrix} Up(i) \\ Vp(i) \end{bmatrix} = \begin{bmatrix} fpxXp(i)/Zp(i) \\ fpyYp(i)/Zp(i) \end{bmatrix} \quad (3)$$

where fpx and fpy are the focal lengths in the X-axis direction and Y-axis direction in the coordinate system of the projection pattern. The calculation of a vertex B(i) into a projection position UVp(i) is not limited to the case of a rectangular solid because similar calculations can be made as long as the three-dimensional information is expressed by points.

Next, suppose that error components (σx, σy, σz) of translational components and error components (σrx, σry, σrz) of orientation components are added to and subtracted from each vertex B(i). The respective resulting vertexes B$^+$(i) and B$^-$(i) are given by the following equations (4):

$$Xm^+=Xm+\sigma x, Ym^+=Ym+\sigma y, Zm^+=Zm+\sigma z$$

$$Rx^+=Rx+\sigma rx, Ry^+=Ry+\sigma ry, Rz^+=Rz+\sigma rz$$

$$Xm^-=Xm-\sigma x, Ym^-=Ym-\sigma y, Zm^-=Zm-\sigma z$$

$$Rx^-=Rx-\sigma rx, Ry^-=Ry-\sigma ry, Rz^-=Rz-\sigma rz \qquad (4)$$

Using B$^+$(i), the three-dimensional measurement apparatus calculates UVp$^+$(i) from (Xm$^+$, Ym$^+$, Zm$^+$) and (Rx$^+$, Ry$^+$, Rz$^+$). B$^-$(i) is used to calculate UVp$^-$(i) from (Xm$^-$, Ym$^-$, Zm$^-$) and (Rx$^-$, Ry$^-$, Rz$^-$).

A model projection range is set as a rectangular area that includes all the three projection points UVp(i), UVp$^+$(i), and UVp$^-$(i). Minimum and maximum values of the projection points UVp(i), UVp$^+$(i), and UVp$^-$(i) may be extracted to set a rectangle that includes the minimum and maximum values. If an actual object lies within the parameters of the error range, an object to be measured appears somewhere in the model projection range. In the present embodiment, a rectangular solid including an object to be measured has been described. Basically, however, the projection range of an object to be measured may be set from the distribution of variation in position or orientation and uncertainty. An object to be measured may be expressed by using a plurality of rectangular solids, and the maximum and minimum values of the projected positions of the rectangular solids may be used. An object to be measured may also be expressed by using any other geometric figure such as a sphere or a circular cylinder, and the projected position of the geometric figure may be calculated. A projected figure formed of a polygonal model of an object to be measured may also be used.

Assume that a model is arranged so that shape values as three-dimensional information of the object to be measured reflect a state including the position and orientation set in step S10. The three-dimensional measurement apparatus then performs projection calculations of a projection pattern onto a screen. The three-dimensional measurement apparatus may use other calculation methods as long as a model projection range can be determined.

For example, the foregoing exemplary embodiment deals with the case of using a pinhole camera model to perform projection calculations of a projection pattern onto a screen based on three-dimensional information. However, an orthogonal projection model may be used if an object to be measured does not vary in depth value and moves along a plane parallel to the camera plane.

If a baseline between the coordinate system of a projection pattern and the camera coordinate system is short, a model projection range may be approximated by values that are calculated in the camera coordinate system.

In step S30, the three-dimensional measurement apparatus determines a coding length of an identification figure of a projection pattern with respect to the model projection range calculated in step S20 so that a range according to the size of the pattern and the density of distance measurement figures includes the model projection range. The size of the pattern depends on the coding length.

Griffin, P. M., L. S. Narasimhan and S. R. Yee, "Generation of uniquely encoded light patterns for range data acquisition," Pattern Recognition, Vol. 25, No. 6, pp. 609-616, (1992), discusses a method for generating an identification figure by using a De Bruijn sequence. Using such a method, the three-dimensional measurement apparatus may set a projection pattern area, which is determined by multiplying the size of a pattern illustrated in FIGS. 3A to 3C by an interval of the distance measurement figures, so that the projection pattern area includes the model projection range.

If an error of the position and orientation is small, the model projection range becomes small. If the interval of the distance measurement figures is fixed, the coding length of the identification figure becomes small. The shorter the coding length, the smaller the number of identification figures. This facilitates the identification of each individual figure and allows stable detection. The number of times of collation with a sequence per identification pattern also decreases for reduced processing time.

The foregoing document discusses a method of generating a pattern where N rows and M columns of sequence includes 3×3 uniquely arranged numerical values. N and M are numbers given by equations (5):

$$N=k^2+(2-1)$$

$$M=k^3+(3-1) \qquad (5)$$

where k is the number of patterns of identification figures.

Figure 7:
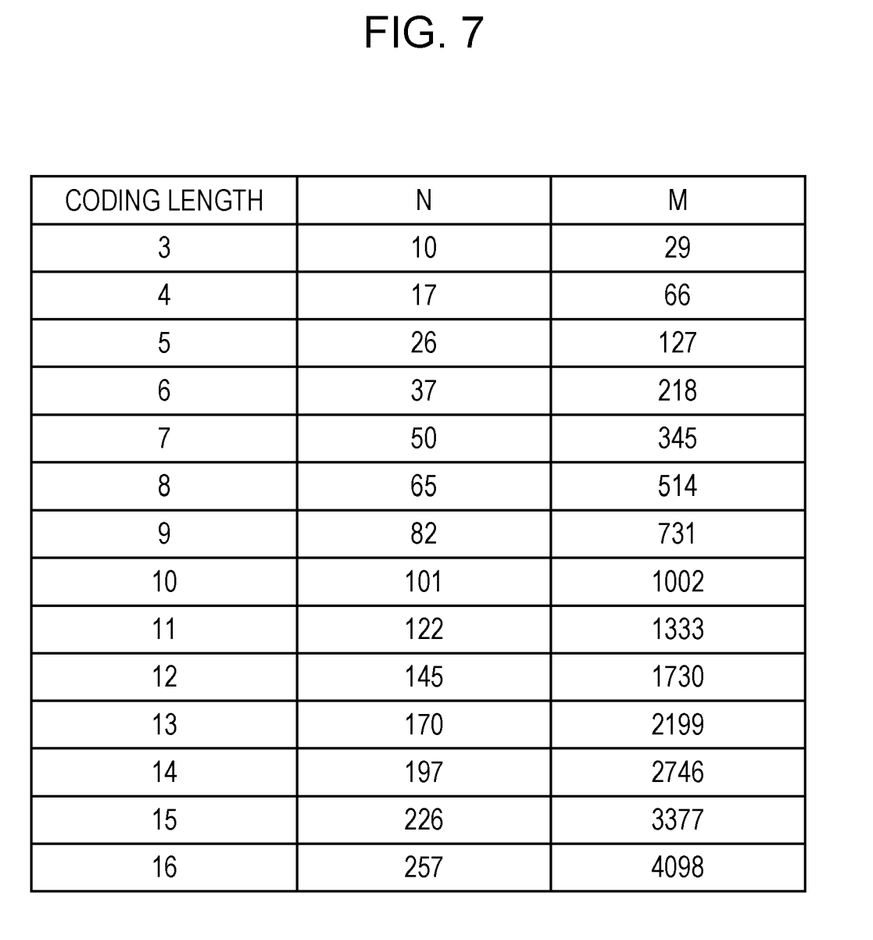
FIG. 7 is a chart illustrating the relationship between a coding length and an N-row M-column sequence.

FIG. 7 is a chart illustrating the relationship between the coding length and an N-row M-column sequence.

FIG. 7 illustrates the values of N and M for each coding length k. As a concrete example of the sequence, row Vhm and column Vhn of a De Bruijn sequence for k=3 are given by equations (6):

$$Vhm=[1\ 1\ 1\ 2\ 1\ 1\ 3\ 1\ 2\ 2\ 1\ 2\ 3\ 1\ 3\ 2\ 1\ 3\ 3\ 2\ 2\ 2\ 3\ 2\ 3\ 3\ 3\ 1\ 1]$$

$$Vhn=[1\ 1\ 2\ 1\ 3\ 2\ 2\ 3\ 3\ 1] \qquad (6)$$

Figure 3A:
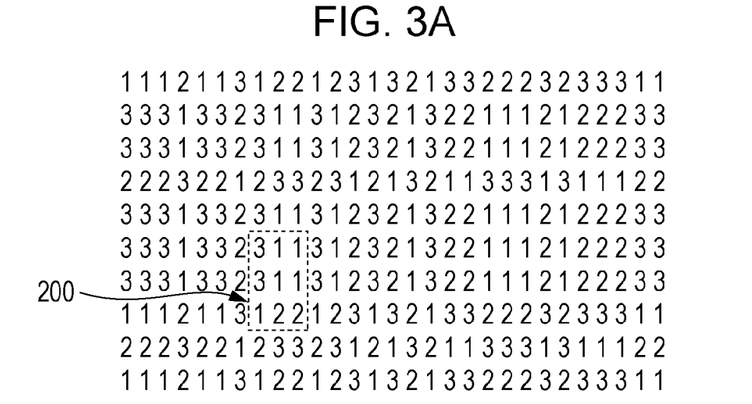
FIGS. 3A, 3B, and 3C are diagrams illustrating a pattern shape of pattern light according to the first exemplary embodiment.

From such a sequence, a pattern value f(i, j) can be expressed by equation (7):

$$f(i,j)=1+((f(i-1,j)+Vhn(i)) \bmod k) \qquad (7)$$

where f(0, j)=Vhm(j). FIG. 3A illustrates the calculated sequence. The sequence is characterized in that values in a 3×3 selected area of the sequence are in a unique arrangement different from those in other 3×3 areas.

Figure 3B:
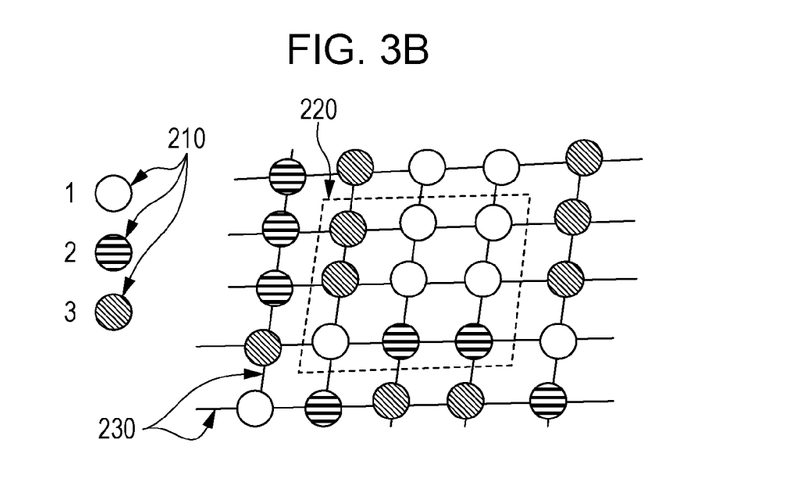

Identification figures are prepared for the numerical values illustrated. In FIG. 3B, circular figures 210 in different colors are used as identification figures for {1, 2, 3}. FIG. 3B illustrates an example where pattern figures including the identification figures 210 arranged at the grid points of grid-like distance measurement figures 230 are projected onto a surface of an object.

Figure 3C:
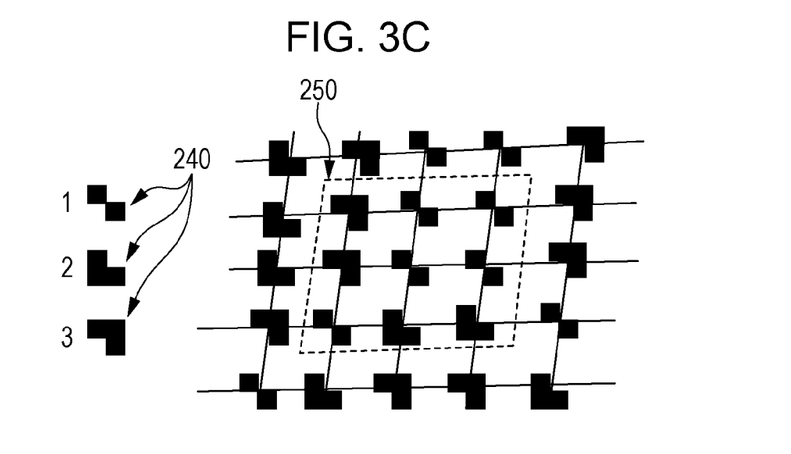

The pattern in the dotted frame 220 corresponds to the pattern of the 3×3 block 200 in FIG. 3A. FIG. 3C illustrates an example where similar identification figures are expressed by arrangement of rectangles.

Identification figures 240 indicate corresponding numerical values by the arrangement of 2×2 rectangles. The dotted frame 250 in FIG. 3C corresponds to the 3×3 block 200 in FIG. 3A.

The actual projection area of the projection pattern is determined by the size of a pattern constituted by the number of identification figures and the density of the distance measurement figures.

Figure 4A:
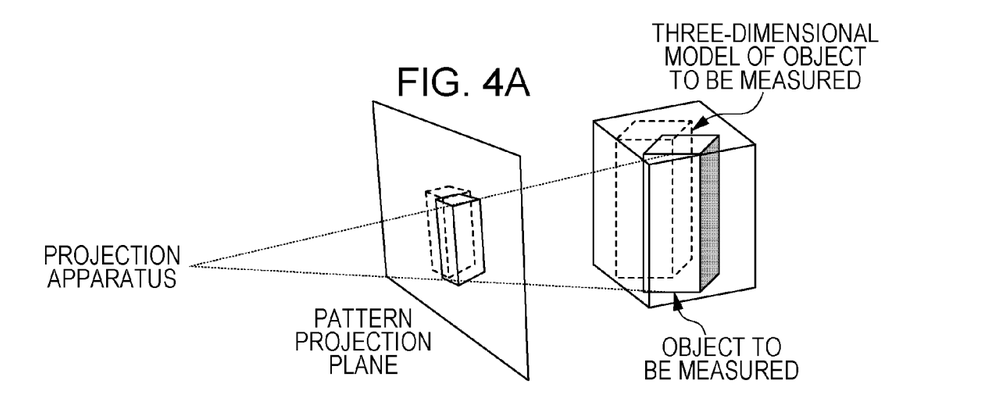
FIGS. 4A, 4B, and 4C are diagrams illustrating the relationship between an object to be measured and a pattern projection plane, the relationship between the accuracy of a position and orientation and a projection range, and the relationship between a coding length and a projection range according to the first exemplary embodiment.

FIG. 4A illustrates the relationship between an object to be measured and a pattern projection plane according to a typical pinhole camera model. Since the assumed position and orientation are not accurate with respect to a projection image of the object to be measured that is actually observed, the projection images deviate from each other.

Figure 4B:
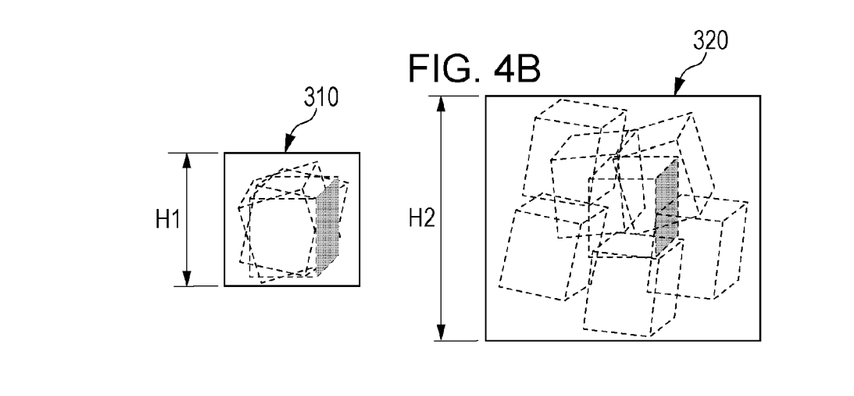
Figure 4C:
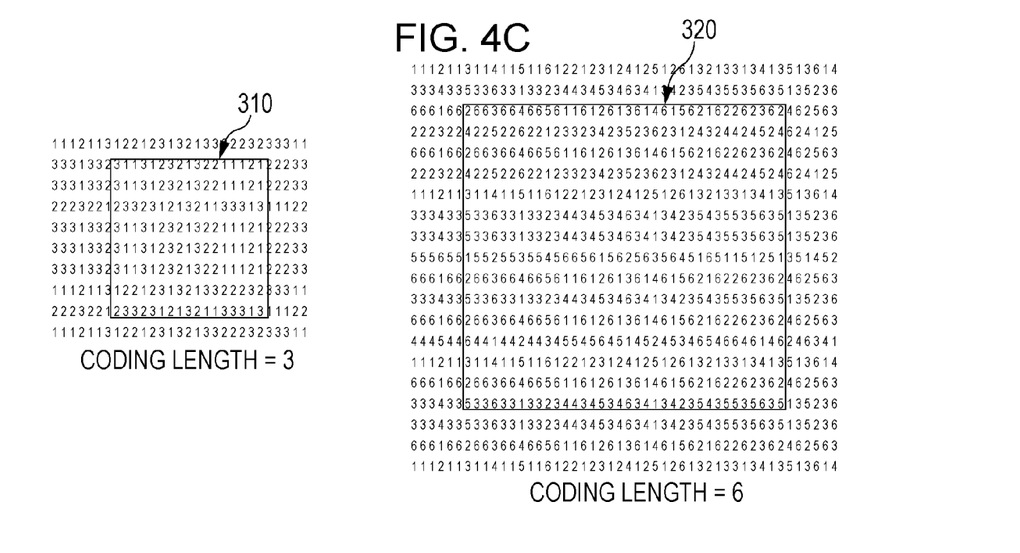

The deviation results from the accuracy and errors of the position and orientation. FIG. 4B is a diagram illustrating a relationship between the accuracy of the position and orientation and the projection range. At high accuracy, a projection image of the object to be measured that is actually observed and a projection image of a three-dimensional model have smaller differences (the left in FIG. 4B).

On the other hand, if a lot of errors are included, the projection image of the three-dimensional model deviates greatly from the projection image of the actual object to be measured (the right in FIG. 4B).

A possible projection range of an error-included projection image is determined by calculation.

The left half of FIG. 4B illustrates a case where the accuracy of the position and orientation is high. The height of the projection range 310 of the three-dimensional model will be referred to as H1. The right half of FIG. 4B illustrates a case where the accuracy of the position and orientation is low. The projection range 320 of the three-dimensional model is greater than the projection range 310. The height of the projection range 320 will be referred to as H2.

In these cases, the three-dimensional measurement apparatus may generate patterns that cover the ranges of H1 and H2, respectively. The three-dimensional measurement apparatus compares the values of N in FIG. 7 with those of H1 and H2, and selects minimum coding lengths to cover H1 and H2, respectively. The model projection range 310 of H1 is small, and a pattern with a coding length of 3 can cover the projection range 310. On the other hand, the model projection range 320 of H2 is large, and the three-dimensional measurement apparatus determines to use a large pattern with a coding length of 6.

In another case where other identification figures are used, the model projection range and the identification figure range may be made adjustable like the method described above.

In step S40, the three-dimensional measurement apparatus generates a projection pattern image by arranging pattern figures having the coding length determined in step S30 as a bitmap image into the model projection range calculated in step S20. Since patterns for respective coding lengths can be generated in advance, the three-dimensional measurement apparatus may simply copy a rectangle including a pattern to the model projection range in a bit map of the entire projection image.

The projection pattern construction unit 40 constructs a projection pattern from information of the identification resolution adjustment unit 30. The projection pattern construction unit 40 constructs the projection pattern according to the respective parameters of the distance measurement figures and the identification figures. It should be appreciated that pattern images for different parameters may be generated in advance so that such a pattern image can be read and set into a bit map as a projection pattern. The distance measurement figures and the identification figures to be used are not limited in particular as long as the distance measurement figures and the identification figures set in step S30 are prepared so that a projection pattern can be projected depending on parameters.

In the foregoing exemplary embodiment, the three-dimensional measurement apparatus calculates a model projection range to be projected by using a three-dimensional model from error-included position and orientation information, using the coding length of the identification figures as a parameter. Then, the three-dimensional measurement apparatus determines the coding length as a parameter for the size of identification figures that cover the range. According to a second exemplary embodiment, the identification resolution adjustment unit 30 may adjust other parameters that determine a projection pattern.

Since an identification pattern has a size of (N, M), the size of an actual projection pattern covers the range of (N×D, M×D), where D is an interval of the distance measurement figures including measurement lines. The identification resolution adjustment unit 30 may therefore perform a pattern adjustment by using D as a parameter. Specifically, the identification resolution adjustment unit 30 may determine D at which the model projection range covers a pattern of (N×D, M×D). If D is large, the density of the measurement lines decreases. Consequently, the range image becomes sparse and the interval between adjoining identification figures widens. This reduces erroneous detection and allows stable detection. On the other hand, if the accuracy of the position and orientation is high, the density of the measurement lines may be increased.

The identification resolution adjustment unit 30 may simultaneously use two parameters including the coding length of the identification figures and the interval of the distance measurement figures. As the number of the identification figures that have been identified increases, each individual identification figure becomes more difficult to identify. In such a case, the interval of the distance measurement figures may be adjusted to widen.

A third exemplary embodiment may be used as processing for generating a projection pattern of a range imaging apparatus.

Figure 5:
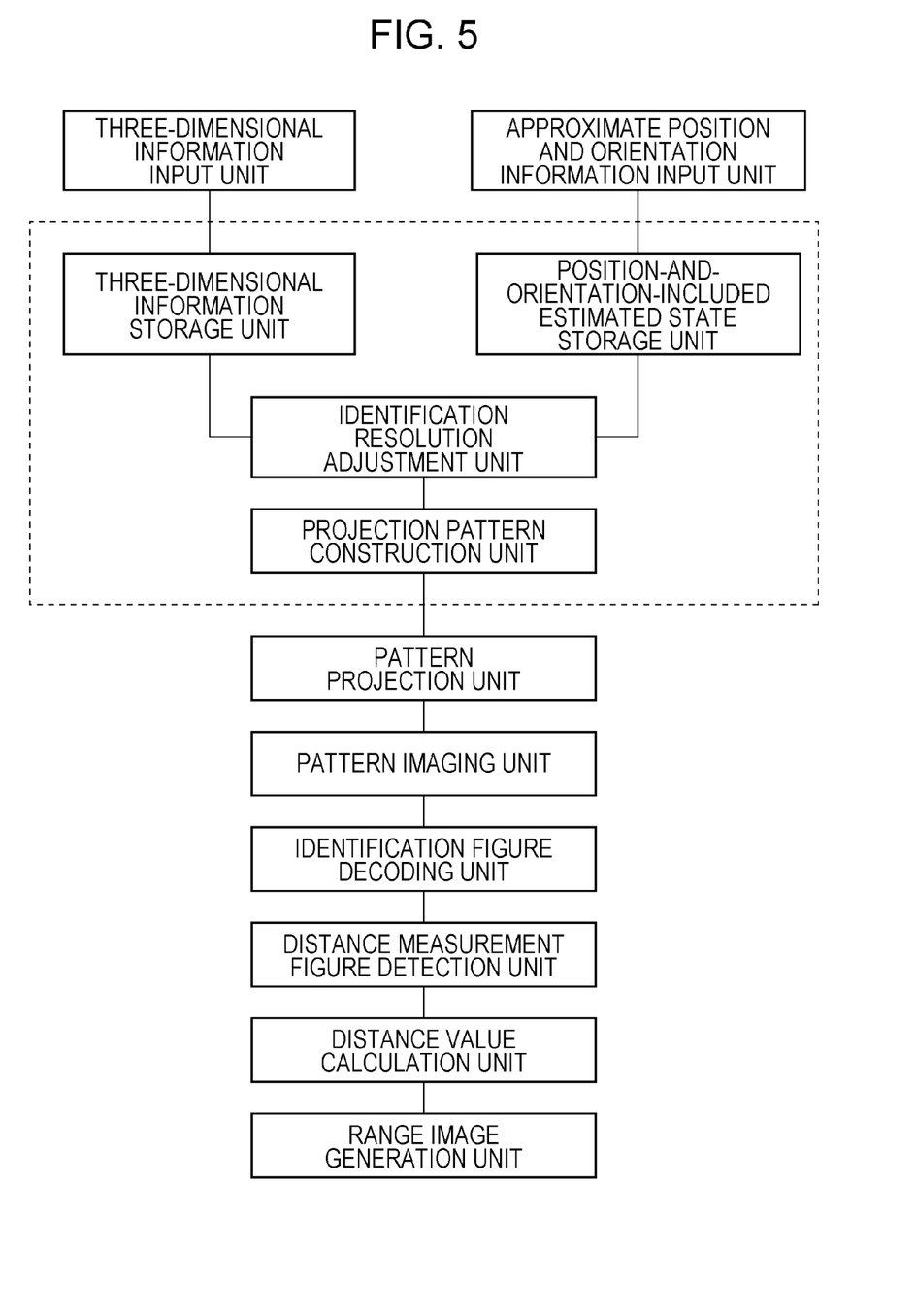
FIG. 5 is a block diagram of a range imaging apparatus according to a third exemplary embodiment of the present invention.

FIG. 5 is a block diagram of the range imaging apparatus according to the present exemplary embodiment.

A three-dimensional information input unit inputs dimensions of a basic figure to which an object to be measured is approximated as model information. For input, values may be displayed on a screen and selected by the user. Values described in a file may be read. Any input mode may be used as long as three-dimensional information on the object to be measured can be input to the range imaging apparatus.

An approximate position and orientation information input unit receives, as an input, the position and orientation of the object to be measured with respect to the range imaging apparatus. Arrangement information on the range imaging apparatus and the object to be measured may be used if known. In consecutive measurements, values obtained in a previous position may be used if the current position is generally the same as the previous position.

The blocks in the dotted frame in FIG. 5 perform the processing steps previously described in the first exemplary embodiments.

The range imaging apparatus according to the present exemplary embodiment is a range imaging apparatus that projects a projection pattern generated by a projection pattern construction unit and captures an image of the projection pattern to acquire a range image. A pattern projection unit and a pattern imaging unit may be implemented by using a liquid crystal projector and a digital camera.

Projection patterns may be stored as films. Pattern projection may be performed by switching such films in accordance with identification resolution. Pattern irradiation may be performed by scanning spot light of a light-emitting diode (LED) or a laser with luminance control.

The present exemplary embodiment can be implemented without problems as long as a plurality of patterns can be switched and captured as a reflected image of an object to be measured. A relative arrangement for pattern projection and pattern imaging, and calibration values needed for range calculation, such as camera parameters and distortion coefficients of a lens, shall be obtained in advance.

An identification figure decoding unit performs detection of the identification figures included in a captured image and decoding into corresponding numerical information. The identification figure decoding unit may perform detection by executing a procedure for image processing for detecting each individual identification figure, such as color area detection and threshold processing. The resulting information shall correspond to the projection pattern construction unit.

A distance measurement figure detection unit detects the distance measurement figures near the identification figures detected by the identification figure decoding unit. The distance measurement figure detection unit then associates the detected distance measurement figures with image positions of the projection pattern.

A distance value calculation unit calculates three-dimensional positions of the distance measurement figures by triangulation based on the relationship between the image positions of the projection pattern associated by the distance measurement figure detection unit and detection positions in the captured image.

The coordinates of a pattern on a plane of a pattern projection image will be denoted by $m=[u, v, 1]^T$. The position of a projected pattern on a captured image will be denoted by $m''=[u'', v'', 1]^T$. When a pattern is actually projected and captured, the detected coordinates will be referred to as an actual projected pattern position $m''$. The position of the actual projection pattern on the captured image will be referred to as a pattern position $m$. A local coordinate transformation matrix R (a 3×3 matrix), t ($t_x$, $t_y$, $t_z$), and the three-dimensional projection position M' of the actual pattern have the relationship given by the following equation (8):

$$\begin{bmatrix} uR_{31} - R_{11} & uR_{32} - R_{12} & uR_{33} - R_{13} \\ vR_{31} - R_{21} & vR_{32} - R_{22} & vR_{33} - R_{23} \\ u''R'_{31} - R'_{11} & u''R'_{32} - R'_{12} & u''R'_{33} - R'_{13} \\ v''R'_{31} - R'_{21} & v''R'_{32} - R'_{22} & v''R'_{33} - R'_{23} \end{bmatrix} M' = \begin{bmatrix} t_x - ut_z \\ t_y - vt_z \\ t'_x - u''t'_z \\ t'_y - v''t'_z \end{bmatrix} \quad (8)$$

M' can be determined by multiplying both sides by a generalized inverse matrix of the matrix on the left-hand side.

A range image generation unit generates a range image in which the image positions of the respective distance measurement figures are associated with distance values.

The processing of the present exemplary embodiment adaptively adjusts the coding length of the identification figures according to the size of the object to be measured included in the range image. As compared to the case of using the identification figures having a coding length for covering the entire projection pattern, the processing of the present exemplary embodiment produces effects of a stable pattern detection and of processing speed-up through a reduction of time for sequence comparison.

Figure 6:
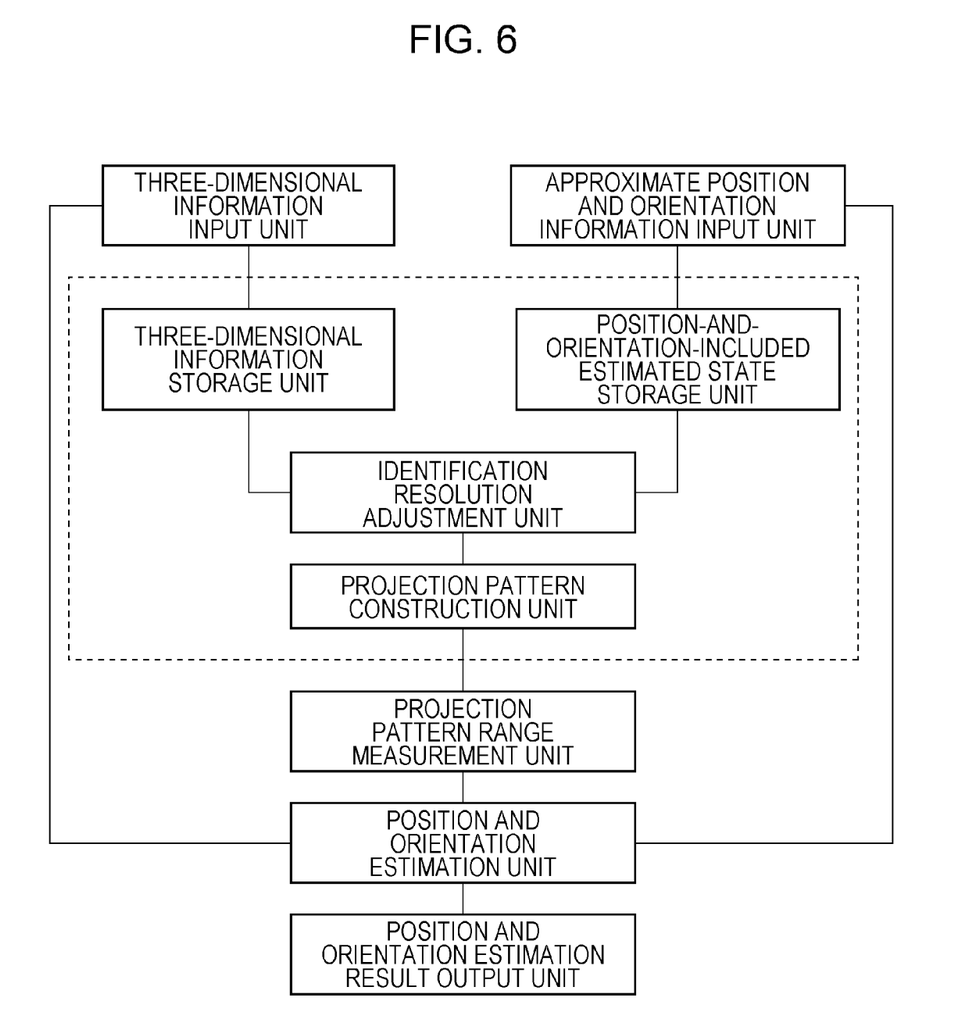
FIG. 6 is a diagram illustrating a configuration of an apparatus for estimating a position and orientation of an object to be measured according to a fourth exemplary embodiment of the present invention.

FIG. 6 is a diagram illustrating a configuration of an apparatus for estimating a position and orientation of an object to be measured according to a fourth exemplary embodiment.

The fourth exemplary embodiment includes processing for range calculation, which is performed by a projection pattern range measurement unit. The projection pattern range measurement unit obtains a range image. Using the range image, a position and orientation estimation unit accurately estimates a position and orientation from three-dimensional information and an approximate position and orientation of an object to be measured. A position and orientation estimation result output unit outputs the estimation result of the position and orientation.

The processing of the position and orientation estimation unit includes a calculation for estimating a position and orientation so as to reduce distances between a shape model of the object to be measured input from the three-dimensional information input unit and distance points included in the range image from the projection pattern range measurement unit.

Examples of methods available to estimate a position and orientation include an iterative closest point (ICP) method discussed in Besl, P. J. and McKay, N. D. "A Method for Registration of 3-D Shapes," IEEE Transactions on Pattern Analysis and Machine Intelligence, Vol. 14, No. 2, pp. 239-256, (1992), and a method discussed in Y. Chen and G. Medioni, "Object modeling by registration of multiple range images," Proceedings of IEEE International Conference on Robotics and Automation, Vol. 3, pp. 2724-2729, (1991). Such methods include determining correspondence of surfaces constituting nearest neighbor shapes with range points in a range image, and updating position and orientation parameters so as to minimize the distances between the corresponding surfaces and distance points. A position and orientation obtained by an approximate position and orientation information input unit may be used as initial values for non-linear optimization.

Values obtained by the position and orientation estimation unit may be used as a state of the position and orientation in step S10. For position and orientation estimation, an image Jacobian is used. The image Jacobian expresses on-screen changes of feature points resulting from minor changes of position and orientation parameters.

Assume that J is an image Jacobian matrix, E is an observation error vector, and Δ expresses a parameter correction term vector. By linear approximation, JΔ=E holds. Using a generalized inverse matrix of J, the parameter correction term Δ is determined by the following equation (9):

$$\Delta = (J^{TJ})^{-1}J^T E \quad (9)$$

The correction term Δ in equation (9) represents differences in the position and orientation parameters of the actual object to be measured. The correction term Δ is calculated from a covariance matrix of an error distribution. The correction term Δ includes variance values in an estimated state of the current position and orientation.

In fact, position and orientation estimation using edges in an image may be performed and the result may be used before calculation of a range image. The method of using edges in an image needs only a single image captured by an imaging apparatus. Edges can be detected as contours. Since information on such edges can be obtained as three-dimensional information on the object to be measured, values equivalent to the correction term Δ can be calculated by using an image Jacobian and initial values at the time of projection onto the camera coordinates.

In the present exemplary embodiment, a result obtained by the position and orientation estimation unit can be utilized to determine a three-dimensional position and orientation in more detail, along with variances thereof. This can make the model projection range accurate and improve the accuracy of adjustment of identification resolution. Since an unnecessary coding length can be reduced, there are provided effects of stabilizing detection of identification figures and reducing processing time for collation of a pattern and a sequence.

An identification resolution adjustment can provide the effects of the exemplary embodiments of the present invention as long as the information concerned includes a position and orientation. The following pieces of information about a position and orientation, and/or geometry of an object to be measured may be used. The available pieces of information include a difference from a focal length, the orientation of a surface to be measured, degrees of similarity of models that are generated at points of view corresponding to respective orientations of a model to an observation image, differences between the points of view and the line-of-sight directions of models specific to the points of view and a stored position and orientation, and fuzziness of distance measurement. Each of the items will be described below.

A difference from a focal length will be described. A projection pattern is projected through an optical lens. An imaging apparatus also uses an optical lens. Such optical elements coincide in focal length only in a limited range. Some locations are in focus, and others are not. In an out-of-focus range, edges of figure elements become blurred and difficult to detect due to defocusing.

Depth information, or a difference between the surface of a shape and a focal length, can be used as information on a position and orientation. If the difference is large, identification resolution is increased to increase measurement points in the depth direction. The identification resolution may be lowered within an in-focus range of focal lengths with no complications because such a range is plane-like.

Specifically, a magnitude due to defocusing is represented as a pixel value. A point spread function (PSF) is used. Suppose that a spread over neighboring pixels due to blurring when one ideal point is imaged is represented by $\sigma$. In such a case, patterns or measurement lines are arranged at intervals shorter than at least $\sigma$, which makes the patterns or measurement lines difficult to identify due to blurring. Therefore, patterns may be set so as to be generated at intervals wider than the value of $\sigma$. For example, a value converted into a pixel value for $3\sigma$ may be set to represent a spatial interval for pattern identification.

The orientation of a surface to be measured will be described. The orientation of a projection apparatus and that of each surface of an object to be measured are also concerned with pattern projection. If a surface is oriented oblique to projection light, the amount of reflected light decreases. Pattern edges become blurred and are difficult to detect. Then, inclined areas where the amount of reflected light drops is detected based on the orientations of each surface of the object to be measured and a light source and the position of a camera. The identification resolution should be increased in such areas. The identification resolution should be decreased where inclination is small.

Light applied from an area corresponding to one of pixels constituting a pattern of a lighting system is observed to be spread in the direction of the normal to the surface irradiated with light when the light is observed from another point of view using trigonometry. The spread of light is calculated from the light source direction, the position and orientation of the surface, and the direction of the camera. A spread of the surface irradiated with light from the normal to each surface of the object to be measured is calculated. Suppose that the spread is represented by $\sigma$. Similarly to that described above, the intervals of patterns may be adjusted in accordance with $\sigma$.

A degree of similarity to a template image will be described. To detect a difference between a feature detection position of an observation image and an estimated model, an object to be measured may be previously observed from a plurality of points of view and the resulting images may be used for the detection. Such images may also be used as information on a position and orientation since the images include information on points of view. The images obtained at the respective points of view are subjected to template matching with an area of a captured image where a model applies, and correlation values are calculated. The correlation values can be used as errors of the position and orientation. If the correlation values are large, the identification resolution should be increased. If the correlation values are small, the identification resolution should be decreased.

First, a plurality of images are acquired at a previously set location of an object to be measured. The images of a portion corresponding to a part area are extracted and are averaged. An averaged image is registered as a template image together with a reference position. Then, an image of the object to be measured which is to be actually captured is acquired, and a cross-correlation coefficient of the pixel value at the reference position in the template is calculated. If the pixel value is deviated from the reference position, the correlation value with the template exhibits a low value. Since the target to be captured is deviated, the coding length should be increased in order to increase identification resolution. If the target to be captured is not deviated, a pattern for increasing the density of the measurement lines or identification patterns should be set to acquire a high-density range image.

The template images mentioned above are prepared in advance by observing the object to be measured in positions and orientations different from a final position and orientation. Differences between information on positions and orientations where the template images are acquired and an estimated position and orientation can thus be used as an index. If differences between the positions and orientations of the template images and the estimated position and orientation are large, the identification resolution should be increased. If the differences are small, the identification resolution should be decreased.

A plurality of images for templates are acquired at a plurality of points of view, and relative positions and orientations between cameras serving as points of view and a model and an averaged captured image are stored in the form of a table. Then, the values of the position and orientation of an actually captured image of the object to be measured are associated with the position and orientation that are nearest among the positions and orientations stored in the table. The difference between the position and orientation stored in the table and the position and orientation of the captured image to be compared is calculated. Euclidean distances may be used for the positions, and the differences between the rotation angles about axes of rotation may be calculated for the orientations. If the differences in position and orientation are large, the part to be measured is regarded as being deviated more than expected. Then, the identification resolution can be set high to reduce false detection of measurement lines.

$\sigma_{3D}$ may be used as a factor for uncertainty of error in triangulation (trigonometry) in a three-dimensional space. $\sigma_{3D}$ is a function dependent on a camera-to-projector baseline and a distance to a measurement point. The camera-to-projector baseline is one of triangulation parameters. The larger the distance, the higher the resolution of distance measurement. This leads to an increase in the distribution in the depth direction. Within a range of variation of positions and orientations, accuracy in the Z direction and accuracy in the pitch and yaw directions are influenced. The accuracy in the Z direction is related to the depth direction, and the accuracy in the pitch and yaw directions is related to the normal to the plane.

The fuzziness $\sigma_{3D}$ of a distance measurement apparatus can be expressed by the following equation (10):

$$\sigma_{3D} = \frac{\sigma_{img}}{fB} Z, \quad (10)$$

where B is the camera-to-projector baseline, Z is the distance to the measurement point, $\sigma_{img}$ is the fuzziness of the measurement point on an image, and f is the focal length of the camera. By using $\sigma_{3D}$, the identification resolution of a pattern to irradiate an object to be measured lying in that area may be adjusted. If the fuzziness $\sigma_{3D}$ is high, identification resolution should be increased. If the fuzziness $\sigma_{3D}$ is low, identification resolution should be decreased.

One or more of the foregoing estimated states of the position and orientation may be used to determine the identification resolution. Such settings may be preset in the system. The user may be allowed to make the settings.

The identification resolution adjustment unit may switch patterns according to the identification resolution of the patterns. Items available to adjust the parameters for changing identification figures and distance measurement figures will be described below. If a size and/or an interval is changed, a pattern also varies in size. The parameters for each element may be adjusted and determined so that a model projection area is covered. The available items include the size of a figure element, pattern switching, and the presence or absence of identification figures. Each of the items will be described below.

As has been described in the first exemplary embodiment, the figure elements may be adjusted in size. If identification resolution is low, a pattern of smaller area should be used. If identification resolution is high, a pattern of larger area should be used.

Specifically, a magnitude due to blurring or variations in a captured image is represented by σ. In such a case, if a figure has a size smaller than σ, the figure may not be detected as one figure element. Thus, σ in a range of variation on a projection image which is calculated from identification resolution should be used, and the size of a figure should be set larger than σ.

Pattern switching will be described. The identification resolution adjustment unit may switch patterns according to accuracy. For example, if identification resolution is high, the identification resolution adjustment unit uses a circular pattern which is less dependent on the direction of detection. If identification resolution is low, the identification resolution adjustment unit uses a pattern that includes fine stripes.

Further, for a pattern other than a circular pattern, the orientation of the pattern can also be adjusted. The orientation of a pattern should be adjusted in accordance with the scanning direction or arrangement of a projector and a camera.

As employed herein, correspondences between "circle", "rectangle", and "line" elements and identification resolutions are registered in the form of a table to show differences in density of pattern figures. A corresponding figure may be referred to from the table in accordance with the identification resolution of a pattern when an image is captured.

If the state of a three-dimensional position and orientation includes sufficiently small variances, accurate projection positions of distance measurement figures on an object surface can be determined from a stored position and orientation and three-dimensional shape information. In such a case, identification figures are not needed. This gives the identification resolution adjustment unit the option of not generating identification figures as a generation parameter for identification figures. This can eliminate the processing of detecting identification figures, whereby the amount of processing is reduced for speedup. Closely arranged distance measurement figures can be used for high-density measurement.

The first exemplary embodiment has dealt with a case where a rectangle that covers the entire object to be measured is set as a model projection range. The identification resolution of the identification figures included in a projection pattern may be adjusted in units of curved surfaces that constitute the object to be measured. For example, a rectangular solid has six faces with respective different normals. The identification figures may be changed face by face (measurement surface by measurement surface).

In such a technique, the model projection ranges are calculated from an estimated state including a position and orientation and models of the respective faces. The projection patterns may be determined by adjusting the identification resolution for each of the model projection ranges. This makes the model projection ranges smaller and coding lengths of the identification figures shorter for stable detection of the identification figures. Time for pattern scanning and collation is reduced for speedup.

Specifically, in the example of the rectangular solid described in the first exemplary embodiment, the vertexes may be processed in units of point sequences constituting the faces.

An eighth exemplary embodiment deals with a case where the position and orientation estimation apparatus described above is used for grasping and assembling by a robot. In a configuration including a robot, observed positions and orientations of the target object differ from one assembly task to another. The proportion of the target object on the screen changes when the target object is observed from a distant position in order to grasp parts and when an area to be assembled is observed while the target object is grasped. If the distance between the robot and the target object is large, the degree of uncertainty in the line-of-sight direction will increase due to the relationship with the baseline. Thus, identification resolution is increased for adjustment such that identification figures can be detected even if the variation of the projected position of the projected pattern is large. If the robot is maintained at a certain orientation while grasping the target object, the degree of uncertainty in the line-of-sight direction decreases to increase the accuracy of position or orientation measurement. When the robot approaches the target, the degree of uncertainty in the line-of-sight directions decreases to increase the accuracy of position or orientation measurement. This enables adjustment for a reduction in identification resolution such as a reduction in coding length. In such a case, the time for pattern scanning and collation is reduced, and therefore the estimation of position and orientation for a short period of time is feasible. The present embodiment provides an example where identification resolution is changed in accordance with the change in observation position by a robot (robot hand). However, an exemplary embodiment of the present invention can also be applied to the case where a position and orientation of a target object are changed by a task. Approximate positions of a plurality of target objects conveyed on a conveyor belt may be estimated by using a projection pattern having a high identification resolution. If a specific object out of the plurality of target objects is grasped, because the approximate positions are known, a multi-line based projection pattern having a low identification resolution may be used to obtain closely arranged range images. That is, an exemplary embodiment of the present invention may provide a system including a drive system that involves changes in position and orientation of a target object. In the system, identification resolution can be changed by using information on constraint conditions such as observation positions and an arrangement of the target object.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention enables appropriate setting of a pattern shape of a projection pattern in three-dimensional position measurement.

The invention claimed is:

1. A measurement apparatus comprising:
a holding unit configured to hold model information of a target object;
an image obtaining unit configured to obtain an image including the target object;
a first obtaining unit configured to obtain an approximate position and/or an orientation of the target object included in the image;
a second obtaining unit configured to obtain a range of variation in the obtained approximate position and/or orientation of the target object;
a first determination unit configured to determine a target range which the target object can take in the image, by projecting the model information onto the image based on the range of variation in the obtained approximate position and/or orientation, obtained by the second obtaining unit, and the approximate position and/or orientation, obtained by the first obtaining unit; and
a second determination unit configured to determine a pattern based on the determined target range.

2. The measurement apparatus according to claim 1, wherein the first determination unit determines the target range by projecting the model information onto the image using further geometry relationship between the target object and an image capturing device capturing the image.

3. The measurement apparatus according to claim 1, further comprising a range image acquisition unit configured to acquire a range image of the target object,
wherein the second determination unit determines the pattern based on the determined target range and a size of the target object included in the range image.

4. The measurement apparatus according to claim 1, wherein the second obtaining unit obtains the range of variation in the position and/or orientation of the target object based on using a constraint condition on an arrangement of the target object.

5. The measurement apparatus according to claim 1, wherein the pattern comprises a plurality of measurement figures and an identification figure for identifying each measurement figure, wherein the identification figure comprises code string information, and
wherein the second determination unit determines a length of the code string information of the identification figure in accordance with the determined target range.

6. The measurement apparatus according to claim 1, wherein the second determination unit determines a density of the pattern in accordance with the determined target range.

7. The measurement apparatus according to claim 1, wherein the second determination unit determines a size of a figure included in the pattern in accordance with the determined target range.

8. The measurement apparatus according to claim 1, wherein the second determination unit is configured to determine switch between presence and absence of a figure included in the pattern in accordance with the determined target range.

9. The measurement apparatus according to claim 1, wherein the second determination unit is configured to determine a shape of the pattern for each surface of the target object in accordance with the range of variation in the obtained approximate position and/or orientation of the target object.

10. An information processing apparatus comprising:
a holding unit configured to hold model information of a target object;
an image obtaining unit configured to obtain an image including the target object;
a first obtaining unit configured to obtain an approximate position and/or an orientation of the target object included in the image;
a second obtaining unit configured to obtain a range of variation in the obtained approximate position and/or orientation of the target object;
a first determination unit configured to determine a target range which the target object can take in the image, by projecting the model information onto the image based on the range of variation in the obtained approximate position and/or orientation, obtained by the second obtaining unit, and the obtained approximate position and/or orientation, obtained by the first obtaining unit; and
a second determination unit configured to determine a pattern based on the determined target range.

11. An information processing method comprising:
obtaining an image including a target object;
measuring an approximate position and/or orientation of an object to be measured, by using a captured image of the object to be measured;
setting identification resolution at which a pattern to be projected onto the target object, using the approximate position and/or orientation of the object to be measured and model information of the object to be measured;
determining a target range which the target object can take in the image, by projecting model information onto the image based on a range of variation in the approximate position and/or orientation of the object to be measured; and
determining a pattern in accordance with the identification resolution.

12. A non-transitory storage medium storing a program readable by a computer of an information processing apparatus including a measurement unit configured to measure a position and/or orientation of a target object on which a determined pattern is projected, a position and orientation of a projection unit that projects the pattern, and a position and orientation of an imaging unit that images an image of the target object, the program causing the computer to execute a method comprising:
- holding model information of a target object;
- obtaining an image including the target object;
- obtaining an approximate position and/or an orientation of the target object included in the image;
- obtaining a range of variation in the obtained approximate position and/or orientation of the target object;
- determining a target range which the target object can take in the image, by projecting the model information onto the image based on the obtained range of variation in the obtained approximate position and/or orientation, and the obtained approximate position and/or orientation; and
- determining a pattern based on the determined target range.

13. The measurement apparatus according to claim 1, further comprising:
- a projection unit configured to project a determined pattern onto the target object;
- an imaging unit configured to image an image of the target object on which the pattern is projected; and
- a measurement unit configured to measure a position and/or orientation of the target object based on the image, a position and orientation of the projection unit, and a position and orientation of the imaging unit.

14. The measurement apparatus according to claim 5, wherein the second determination unit is configured to determine a shorter length of code string information as the target range is smaller.

* * * * *